(12) United States Patent
Reinhard et al.

(10) Patent No.: US 7,415,411 B2
(45) Date of Patent: Aug. 19, 2008

(54) METHOD AND APPARATUS FOR GENERATING ACOUSTIC MODELS FOR SPEAKER INDEPENDENT SPEECH RECOGNITION OF FOREIGN WORDS UTTERED BY NON-NATIVE SPEAKERS

(75) Inventors: Klaus Reinhard, Arnstadt (DE); Jochen Junkawitsch, Eschenbach (DE); Andreas Kießling, Marloffstein (DE); Rainer Klisch, Nürnberg (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 879 days.

(21) Appl. No.: 10/793,072

(22) Filed: Mar. 4, 2004

(65) Prior Publication Data

US 2005/0197835 A1    Sep. 8, 2005

(51) Int. Cl.
*G10L 15/00*    (2006.01)
(52) U.S. Cl. .............................. 704/257; 704/8; 704/10; 704/243
(58) Field of Classification Search ................ 704/257, 704/243, 8, 10, 255, 276
See application file for complete search history.

(56) References Cited

U.S. PATENT DOCUMENTS

| 6,085,160 A | 7/2000 | D'hoore | |
| 2003/0050779 A1* | 3/2003 | Riis et al. | 704/236 |
| 2005/0033575 A1* | 2/2005 | Schneider | 704/254 |
| 2007/0118377 A1* | 5/2007 | Badino et al. | 704/260 |

OTHER PUBLICATIONS

Georg Stemmer, Elmar Noth, Heinrich Niemann, "Acoustic Modeling of Foreign Words in a German Speech Recognition System", Eurospeech 2001—Scandinavia, 4 pages, University of Erlangen-Nurnberg, Chair for Pattern Recognition, Erlangen, Germany.
Helen M. Meg, Wai-Kit Lo, Berlin Chen, Karen Tang, "Generating Phonetic Cognates to Handle Named Entities in English-Chinese Cross-Language Spoken Document Retrieval", 4 pages, The Chinese University of Hong Kong, National Taiwan University, Princeton University.
"Sampa speech assessment methods phonetic alphabet", SAMPA computer readable phonetic alphabet, 2 pages.

* cited by examiner

*Primary Examiner*—Daniel D Abebe

(57) ABSTRACT

Acoustic models for speech recognition are automatically generated utilizing trained acoustic models from a native language and a foreign language. A phoneme-to-phoneme mapping is utilized to enable the description of foreign language words with native language phonemes. The phoneme-to-phoneme mapping is used for training foreign language words, described by native language phonemes on foreign language speech material. A new phonetic lexicon is created containing foreign language words and native language words transcribed by native language phonemes. Robust native language acoustic models can be derived utilizing foreign language and native language training material. The mapping may be used for training a grapheme to phoneme transducer (i.e., foreign language to native language) to generate native language pronunciations for new foreign language words.

20 Claims, 2 Drawing Sheets

METHOD AND APPARATUS FOR GENERATING ACOUSTIC MODELS FOR SPEAKER INDEPENDENT SPEECH RECOGNITION OF FOREIGN WORDS UTTERED BY NON-NATIVE SPEAKERS

TECHNICAL FIELD OF THE INVENTION

The present invention is directed, in general, to a speech recognition method and apparatus, and more particularly, to speech recognition apparatus and method for recognizing speech uttered by a non-native speaker.

BACKGROUND OF THE INVENTION

Speech-enabled applications using speaker-independent speech recognition technology are characterized by a vocabulary utilizing a language dependent phonetic description. And typically, the vocabulary uses language specific acoustic models for such phonetic symbols. The applications therefore utilize a native language phonetic inventory or a foreign language phonetic inventory to recognize and transcribe the vocabulary to be recognized.

Current speech recognition systems support only individual languages. If words of another language need to be recognized, acoustic models associated with that language must be used. An acoustic model is a set of acoustic parameters generated during training, representing the pronunciations(s) of a word or sub-word unit and is used for speech recognition. For most speech recognition systems, these models are built, or trained, by extracting statistical information from a large body of recorded speech. To provide speech recognition in a given language, one typically defines a set of symbols (phonetic symbols and phonemes will be used interchangeably hereinafter), known as phonemes, which represent all sounds of that language. For multi-language, speaker-independent speech recognition, a common set of multilingual phonemes and acoustic models are needed for each respective language under consideration. When supporting a wide range of languages a large database covering all languages must be provided.

A large quantity of spoken samples in each language is typically recorded to permit extraction of an acoustic model for each of the phonemes for each particular language. Usually, a number of native speakers—i.e. people having the language as their mother tongue—are asked to record a number of utterances. A set of the recordings of the utterances is referred to as a speech database. The recording of such a speech database for every language one wants to support is very costly and time consuming.

Name dialing in a mobile phone environment may serve as an example for such a scenario. In a mobile phone, words to be added to the active vocabulary may stem from different languages as entries in the personal phonebook, such as names from different countries. To address such phonebook entries using a voice enabling process the names need to be processed properly to derive acoustic models for them. For recognition, acoustic models are utilized for representing the pronunciation of words, phonemes, etc. Typically such acoustic models are language specific and a lexicon lookup or language specific grapheme-to-phoneme (G2P) algorithm yields a phonetic description, which is used by a language specific phoneme-based recognizer. The phonetic realization, i.e., the pronunciation of foreign words uttered by a non-native speaker is the main problem of a multi-language approach to obtain good recognition results for these foreign words.

Most foreign words typically cannot be described accurately in a phonetic inventory of the speaker's native language. (NL) since sounds for specific phonetic units generally do not correspond exactly in the NL. Nevertheless, the articulation capability of the speaker is reflected in the sounds of the NL represented by the NL phonetic inventory. A phonetic inventory is a (language specific) set of phonetic symbols that does not include sound recordings. In some cases the foreign words cannot be completely described in the NL due to missing sounds (e.g. the English word email [ee m ey I] is not describable by the German phoneme set due to the missing sound [ey] in the German language). Moreover, NL acoustic models for FL words are inaccurate and result in low recognition performance even if uttered by FL speakers. Additionally, even when the foreign word can be transcribed within the NL phoneme inventory problems may arise from the "phono-tactics" of FL (foreign language) words, which do not correspond to the phono-tactics of NL words. Phono-tactics is the set of allowed arrangements or sequences of phonemes and thus, speech sounds in a given language. A word beginning with the consonant cluster (zv), for example, violates the phono-tactics of English, but not of Russian. In particular when context dependent acoustic models (like triphones) are utilized for the recognition, different phono-tactics may result in missing triphones and thus in a less accurate modeling of words and a reduced recognition performance.

Basically, even applying a multi-language recognition engine that supports several (native) languages to recognize application words spoken by non-native speakers will not yield the best results. This is due to the fact that the non-native speaker will color the foreign words with the speaker's mother tongue and the description of the foreign words with the FL phoneme inventory and FL acoustic models is usually not accurate enough and will not necessarily give best recognition results. The best solutions—training of these FL words with non-native speech of many speakers—is usually not feasible due to the very limited availability of large, appropriate training databases, i.e., speech recordings of non-native pronunciations (i.e. from many NL speakers) of FL words from the specific target language(s). Typically, the speaker is not at all familiar with the FL inventory and describing newly added foreign words with NL phonemes is a serious undertaking.

What is needed is a speech recognition system that accepts input from speakers speaking words that are foreign to the speakers' native language and is capable of utilizing the speaker's native phoneme inventory to describe the pronunciation of foreign language words where utterances of these words, from native and non-native speakers, are recognized with high accuracy.

BRIEF SUMMARY OF THE INVENTION

To address the above-discussed deficiencies of the prior art, in order to facilitate the description of FL words with NL phoneme symbols, the phonetic inventory of the foreign language is mapped onto the native language phonetic inventory of the speaker. This is termed a phoneme-to-phoneme (P2P) mapping methodology. Hence, the acoustics of the foreign language can be trained on the phonetic inventory of the native language. Utilizing the P2P mapping, foreign words can be described in the native language phonetic inventory. Additionally, to support and improve recognition of such words uttered by either native or non-native speakers, mixing of acoustic models from both languages can be performed in several different ways (e.g. either by clustering corresponding acoustic models or simply by using mixture density models from native and foreign language training, which is now possible because of the use of a common phoneme inventory). A time alignment between analysis frames and foreign language phonemes for each training utterance is derived during a phoneme-based training. For each training utterance it is known what is said and how the spoken words are phonetically described (i.e., a phonetic lexicon).

A trained native language phoneme set is used to derive a set of trained phonemes for a free phoneme recognizer. This native language recognizer is applied to derive a time alignment between the analysis frames and the native language phonemes for the same foreign language training utterances used above. Both alignments result in an association of each foreign language phoneme onto native language phonemes including a list comprising the number of hits, i.e. how many time frames a particular NL phoneme is mapped onto a FL phoneme. Using the number of hits as a basis to map particular native language phonemes to foreign language phonemes, a consistent P2P mapping is derived.

Using this mapping a new training can be started where the phonetic lexicon contains now native language words and foreign language words described by NL phonemes. Now, both training materials foreign language utterances and native language utterances can be used resulting in robust acoustic models covering foreign words.

The foregoing summary has outlined rather broadly the features and technical advantages of the present invention. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. In particular, a controller may comprise one or more data processors, and associated input/output devices and memory that execute one or more application programs and/or an operating system program. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

Figure 1:
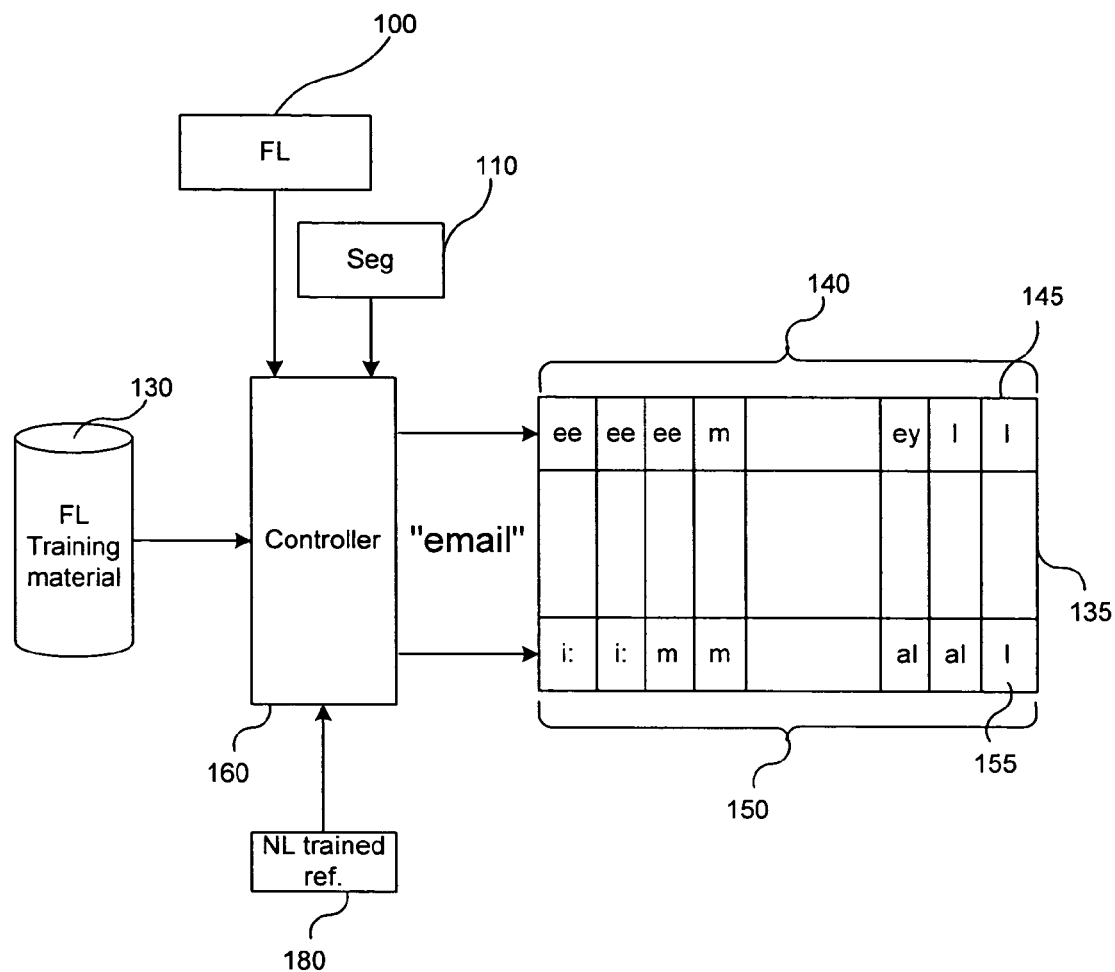
FIG. 1 illustrates an exemplary high-level block diagram of a phoneme-to-phoneme mapping system according to a preferred embodiment of the present invention.
Figure 2:
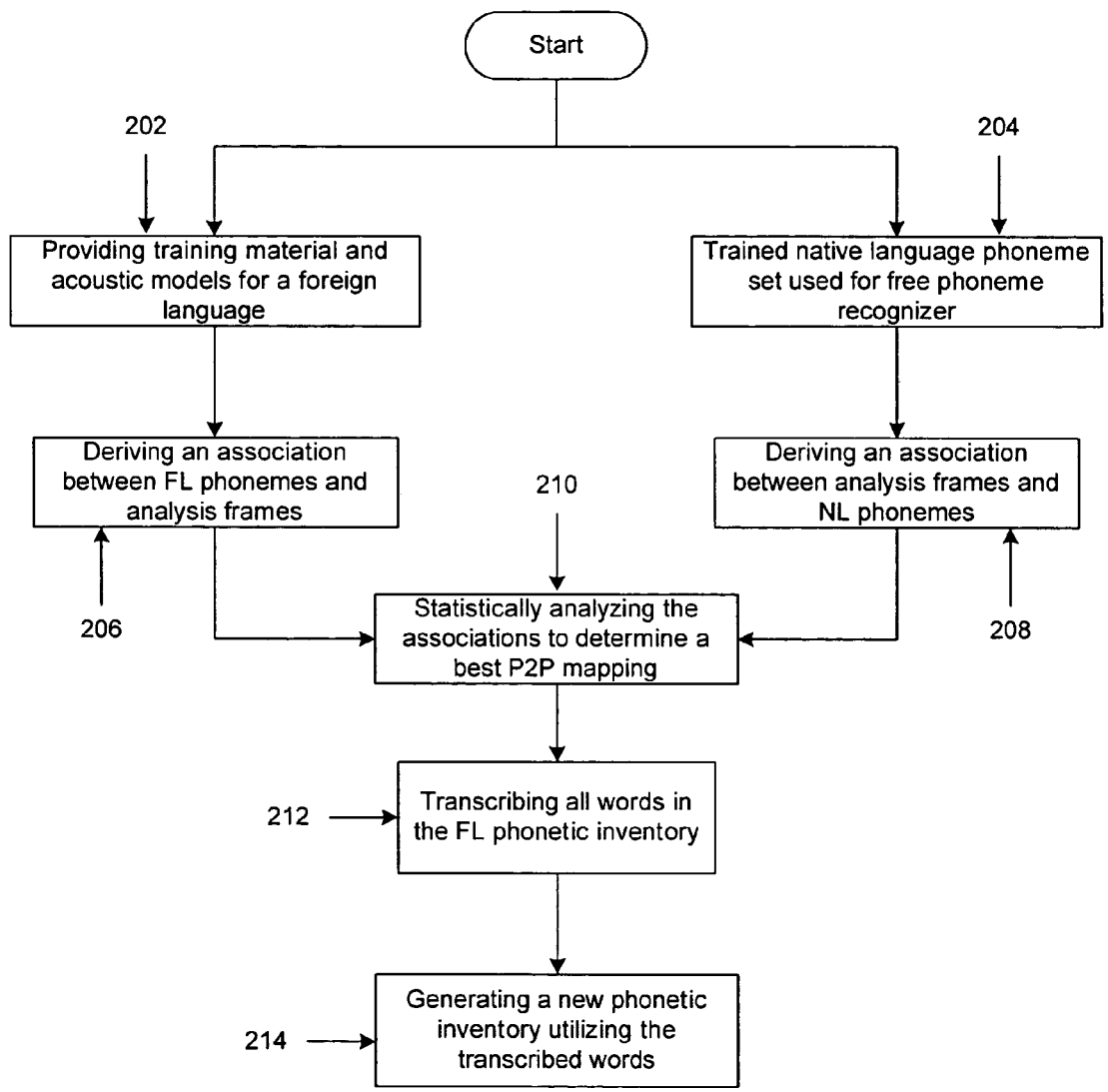
FIG. 2 depicts a process for generating acoustic models of a foreign language utilizing native language phonemes, in accordance with a preferred embodiment of the present invention.

FIGS. 1 and 2, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged speech recognition system.

FIG. 1 depicts a high-level block diagram of a phoneme-to-phoneme mapping system in accordance with a preferred embodiment of the present invention. Database 130 (FL training material) contains recorded utterances, pursuant transliterations and a phonetic lexicon for a foreign language. Database (FL) 100 contains trained acoustic models of this same foreign language. These models can be used to derive a time alignment between FL phonemes and analysis frames for the utterances from database 130. Usually such a time alignment is the byproduct of a phoneme-based training algorithm, which is part of controller 160. The time alignment is illustrated with phonetic symbol 145, which is part of the set of FL phonetic symbols 140 that make up the word "email," being depicted as being aligned with analysis frame 135. Analysis frame 135 is typically a fixed analysis window (25 ms with a 10 ms shift). The set of FL phonetic symbols 140 make up the word email in the foreign language. Alternatively, to this time alignment, database 110 represents an already existing segmentation for database 130 (such databases are sometimes available), which can be used instead of the computed time alignment from a phoneme-based training.

Controller 160 operates a training algorithm for phoneme-based training as well as a speech recognizer (not shown). Database 130 provides input to controller 160. Each word in Foreign Language utterances is phonetically described in a FL phonetic lexicon, which is also provided in database 130. A phonetic lexicon contains the phoneme representation (given as a sequence of phoneme symbols from the phoneme inventory) for each word contained in the utterances of database 130.

NL database 180 contains the trained acoustic models of the native language (similar to the models for the FL in database 100). Such acoustic models can be used to derive an association between an analysis frame and a NL phonetic symbol by running a free NL phoneme recognizer (included in controller 160, not shown) on the FL utterances from database 130. The resulting NL phoneme sequence from this recognition procedure for the word "email" is depicted in NL phonetic symbol set 150. NL phoneme symbol 155 is in this way associated with analysis frame 135 and thus also with FL phoneme symbol 145.

Controller 160 retrieves the associations between analysis frames and individual phoneme symbols for both FL and NL. All these associations over the complete FL database 130 are statistically analyzed to determine a best mapping between the FL and NL phonetic inventories (which can also comprise probabilities for each individual phoneme mapping). This phoneme-to-phoneme (P2P) mapping is then used to transcribe all words in the foreign language lexicon with symbols from the native language phonetic inventory. This new lexicon is stored in database 130. As shown, NL phonetic symbol 155, which is part of the set of NL phonetic symbols 150 that make up the word "email," is depicted as being aligned with analysis frame 135. FL phonetic symbol 145 can then be mapped to the NL phonetic symbol 155. Performing such an alignment step as depicted in analysis frame 135 for all utterances of the FL training material contained in database 130, each FL phoneme is associated with the matching list of NL phonemes (and vice versa) together with the number of alignment occurrences, so called "hits." These matching hits are derived from the number of correspondences between FL phonemes and NL phonemes. A consistent mapping procedure can then be derived by a majority vote. If a FL phoneme is equally mapped onto several NL phonemes, several pronunciation variants can be added to the new pronunciation lexicon.

The new phonetic lexicon, which now consists of FL words described by NL phonetic symbols, is derived from the mapping procedure, i.e., old lexicon: entry "email: ee m ey I" results in the new lexicon entry: "email: i: m al I" and stored, e.g., in database 130 Based on this new phonetic lexicon a grapheme to phoneme G(FL)-to-P(NL) transducer may also be trained to generate NL pronunciations for new/unknown FL words.

The training algorithm in controller 160 may then utilize the new phonetic lexicon (now part of database 130) for generating NL phonetic descriptions of the FL utterances in database 130 and for training acoustic models for the NL phonemes utilizing the FL training material. Also the resulting new acoustic models can be mixed with the acoustic models from database 180 which is based on the same NL phonetic inventory but trained on NL material.

FIG. 2 illustrates a process for generating acoustic models of a foreign language utilizing native language phonemes in accordance with a preferred embodiment of the present invention. The mechanics of the process may be more fully understood by referring to FIG. 1 while going through the steps of the process. The process begins with providing, to a controller, training material and acoustic models for a foreign language and training material and acoustic models for a native language (Step 202, 204) (see the description of the controller and its capabilities in FIG. 1). The training material comprises, generally, utterances (speech) by a speaker fluent in the language stored in a training material database. The speaker is familiar with the pronunciation of the material as defined by the SAMPA notation (Speech Assessment Methods Phonetic Alphabet is a machine-readable phonetic alphabet).

Prior to the input of the foreign language utterances, the apparatus of the present invention retrieves phoneme symbols from both a native language phonetic inventory database and a foreign language phonetic inventory database. A free native language phoneme recognizer (unrestricted recognition of a sequence of native language phonemes for each foreign language utterance) is utilized in one embodiment of the present invention to associate each native language phoneme symbol with a corresponding analysis frame (a fixed window, typically 25 ms with a 10 ms shift). A foreign language phoneme-based training algorithm is utilized to derive an alignment between each foreign language phoneme symbol and a corresponding analysis frame. The sequences of native language symbols are set in correspondence with the sequence of foreign language symbols utilizing the analysis frames to provide an alignment means. (Step 206, 208)

The correspondence of the foreign language with the native language symbols is then statistically analyzed to determine a best phoneme-to-phoneme mapping of the phoneme symbols of the foreign and native languages. (Step 210) This P2P mapping is then used to transcribe all words in the FL inventory with the corresponding NL phoneme symbols. (Step 212)

The results of the mapping are stored in a new phonetic inventory, which consists of foreign language words described by native language phonetic symbols. (Step 214) For example in the foreign language inventory (lexicon may be used interchangeably with inventory), email would be described as "ee m ey I". In the new lexicon email has the following native language symbols "$i:_{NL}$ $m_{NL}$ $al_{NL}$ $I_{NL}$. Utilizing the native language phonetic description of the foreign utterances, a training can then be started to obtain a set of trained native language phoneme references on foreign training material (Step 220).

Mixing the phonetic model inventories from NL training and FL training results in a robust speaker-independent phoneme inventory, which is capable of modeling foreign words for a non-native speaker. Robust voice-enabled user interfaces are an important part for user-friendly man-machine interface (MMI). The present invention helps to improve speech recognition accuracies for such systems. Recognition performances in multi-language applications are improved when a non-native speaker utters foreign words.

Although the present invention has been described in detail, those skilled in the art should understand that they can make various changes, substitutions and alterations herein without departing from the spirit and scope of the invention in its broadest form.

What is claimed is:

1. A method for automatically generating acoustic models for speech recognition, comprising the steps of:

utilizing stored training material, which includes recorded utterances in a first language, in conjunction with trained acoustic models of the first language;

deriving a time alignment between analysis frames, for the recorded utterances, and phonemes of the first language utilizing a phoneme-based training algorithm;

deriving associations between the analysis frames and phonemes of a second language utilizing a second language phoneme recognizer on the recorded utterances in the first language;

retrieving the associations between the analysis frames and individual phoneme symbols for both the first language and the second language, wherein such retrieved associations are stored;

statistically analyzing the associations to determine a best phoneme to phoneme (P2P) mapping between the first and second language phonetic inventories;

transcribing all words in the first language phonetic inventory, utilizing the best P2P mapping, utilizing phonemes from the second language phonetic inventory; and generating a new phonetic inventory utilizing the transcribed words of the first language phonetic inventory.

2. The method of claim 1, wherein the first language is a foreign language (FL) and the second language is a native language (NL).

3. The method of claim 2, wherein utterances for the native language is provided utilizing native speakers speaking words in the native language for input into the phonetic reference inventory of the native language.

4. The method of claim 2, wherein the utterances for the foreign language is provided utilizing foreign speakers speaking words in the foreign language for input into the phonetic inventory of the foreign language.

5. The method of claim 1 wherein deriving a time alignment between analysis frames and phonemes of the first language, further comprises
retrieving a word or phrase from the first phonetic inventory;
separating each word into phonemes; and
associating each of the phonemes comprising the word or phrase with the analysis frames.

6. The method of claim 1, wherein deriving associations between the analysis frames and phonemes of a second language, further comprises
retrieving a word or phrase from the second phonetic inventory;
separating each word into phonemes; and
associating each of the phonemes comprising the word or phrase with the analysis frames.

7. The method of claim 1, further comprising
providing speech training material comprising foreign speech having sounds, words and phrases wherein the speech is phonetically described.

8. The method of claim 1, further comprising providing a phonetic inventory database wherein the phonetic inventory includes existing word and phrase segmentation in the form of phoneme sequences.

9. The method of claim 8, wherein the existing word and phrase segmentation is utilized to derive a relationship between analysis frames and phonetic symbols.

10. The method of claim 1, wherein the time alignment of analysis frames with phonemes of the first and second language is accomplished during a training iteration.

11. An apparatus for automatically generating acoustic models for speech recognition, comprising:
a phonetic inventory of a first language;
a phonetic inventory of a second language;
a controller for:
utilizing stored training material, which includes recorded utterances in a first language, in conjunction with trained acoustic models of the first language;
deriving a time alignment between recorded utterance analysis frames and phonemes of the first language utilizing a phoneme-based training algorithm;
deriving associations between the analysis frames and phonemes of a second language utilizing a second language phoneme recognizer on the recorded utterances in the first language;
retrieving the associations between the analysis frames and individual phonemes for both the first language and the second language, wherein such retrieved associations are stored;
statistically analyzing corresponding associations between the analysis frames to determine a best phoneme to phoneme (P2P) mapping between the first and second language phonetic inventories;
transcribing all words in the first language phonetic inventory, utilizing the best P2P mapping, with phonemes from the second language phonetic inventory; and
generating a new phonetic inventory utilizing the transcribed words of the first language phonetic inventory.

12. The apparatus of claim 11, wherein the first language is a foreign language (FL) and the second language is a native language (NL).

13. The apparatus of claim 12, wherein speech input for the native and foreign language is provided, utilizing native speakers speaking words in the native language and foreign speakers speaking words in the foreign language respectively for input into the phonetic inventory of the native and foreign languages.

14. The apparatus of claim 12, further comprising a grapheme (in a foreign language) to phoneme (in a native language) transducer for generating native language pronunciations for new foreign language words.

15. The apparatus of claim 11 further comprising:
a training algorithm for associating phonetic symbols of foreign speech with phonemes retrieving a word or phrase from the first phonetic inventory;
means for separating each word into phonetic symbols; and
means for associating each of the phonetic symbols that comprise the word or phrase with related analysis frames.

16. The apparatus of claim 11, wherein the controller further comprises
means for retrieving a word or phrase from the second phonetic inventory;
means for separating each word into phonetic symbols; and
means for associating each of the phonetic symbols comprising the word or phrase with analysis frames.

17. The apparatus of claim 11, further comprising
a database for providing training material comprising foreign speech having sounds, words and phrases wherein the material is phonetically described.

18. The apparatus of claim 11, further comprising a phonetic inventory database of the second language wherein the phonetic inventory includes existing word segmentation in the form of phonemes of the second language.

19. The apparatus of claim 18, wherein the existing word segmentation is utilized to derive a relationship between the analysis frames and the phonemes of the second language.

20. The apparatus of claim 11 wherein the time alignment of analysis frames with the phonemes of the first and second languages is accomplished during a training iteration.

* * * * *